United States Patent [19]
Thomson

[11] 3,802,298
[45] Apr. 9, 1974

[54] SCREW FEED UNIT HEAD

[76] Inventor: James Arnold Thomson, "Heronfield," 7 Alderpark Rd., Solihull, Birmingham, Warwickshire, England

[22] Filed: Aug. 31, 1972

[21] Appl. No.: 285,354

[52] U.S. Cl.................................. 74/840, 408/133
[51] Int. Cl........................................... F16h 35/00
[58] Field of Search ............... 74/840, 841; 408/133

[56] References Cited
UNITED STATES PATENTS

| | | | |
|---|---|---|---|
| 3,103,835 | 9/1963 | Rye et al.............................. | 74/841 |
| 3,132,541 | 5/1964 | Muthler............................. | 408/133 |
| 2,768,539 | 10/1956 | Wollenhaupt et al. ............. | 408/133 |
| 3,232,143 | 2/1966 | Schurger et al..................... | 408/133 |
| 3,430,524 | 3/1969 | Thomas.............................. | 408/133 |

Primary Examiner—Benjamin W. Wyche
Assistant Examiner—Wesley S. Ratliff, Jr.
Attorney, Agent, or Firm—Holman & Stern

[57] ABSTRACT

A screw feed unit head comprises a drive motor and a spindle mounted in a body slidable along a way formed on a base member, the spindle being arranged to be driven by the motor and being adapted to be coupled to a cutting tool. A lead screw is fixedly mounted on the base member and co-operates with a nut rotatably mounted in the body, the nut being non-displaceable relative to the body. A quick traverse motor is detachably mounted in one side of the body and a detachable drive unit for transmitting drive from the spindle to the nut through a clutch and from the quick traverse motor to the nut directly is mounted in the opposite side of the body. In an alternative embodiment, the nut is fixedly mounted in the body and the lead screw is mounted rotatably in a thrust block secured to the base member, the spindle being non-displaceable relative to the thrust block. The quick traverse motor and drive unit are detachably mounted in the thrust block, the drive unit being arranged for transmitting drive to the lead screw from either the quick traverse motor or from a feed motor also mounted on the thrust block.

11 Claims, 5 Drawing Figures

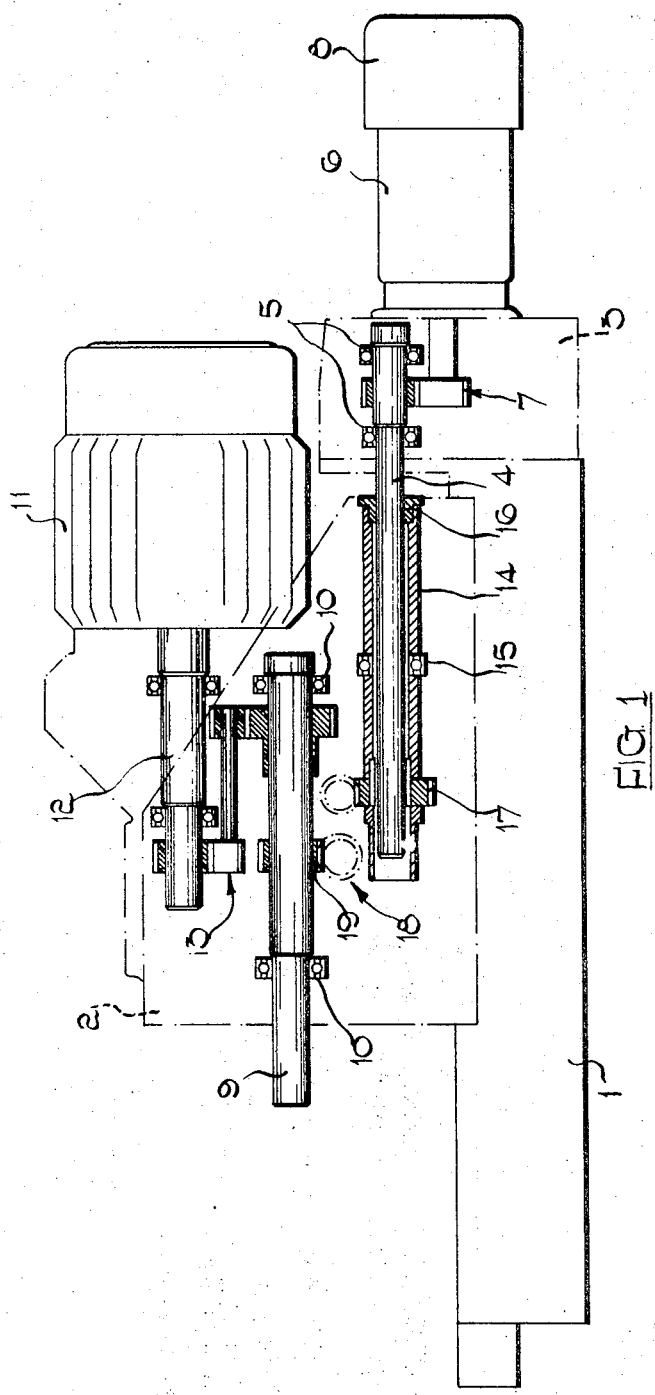

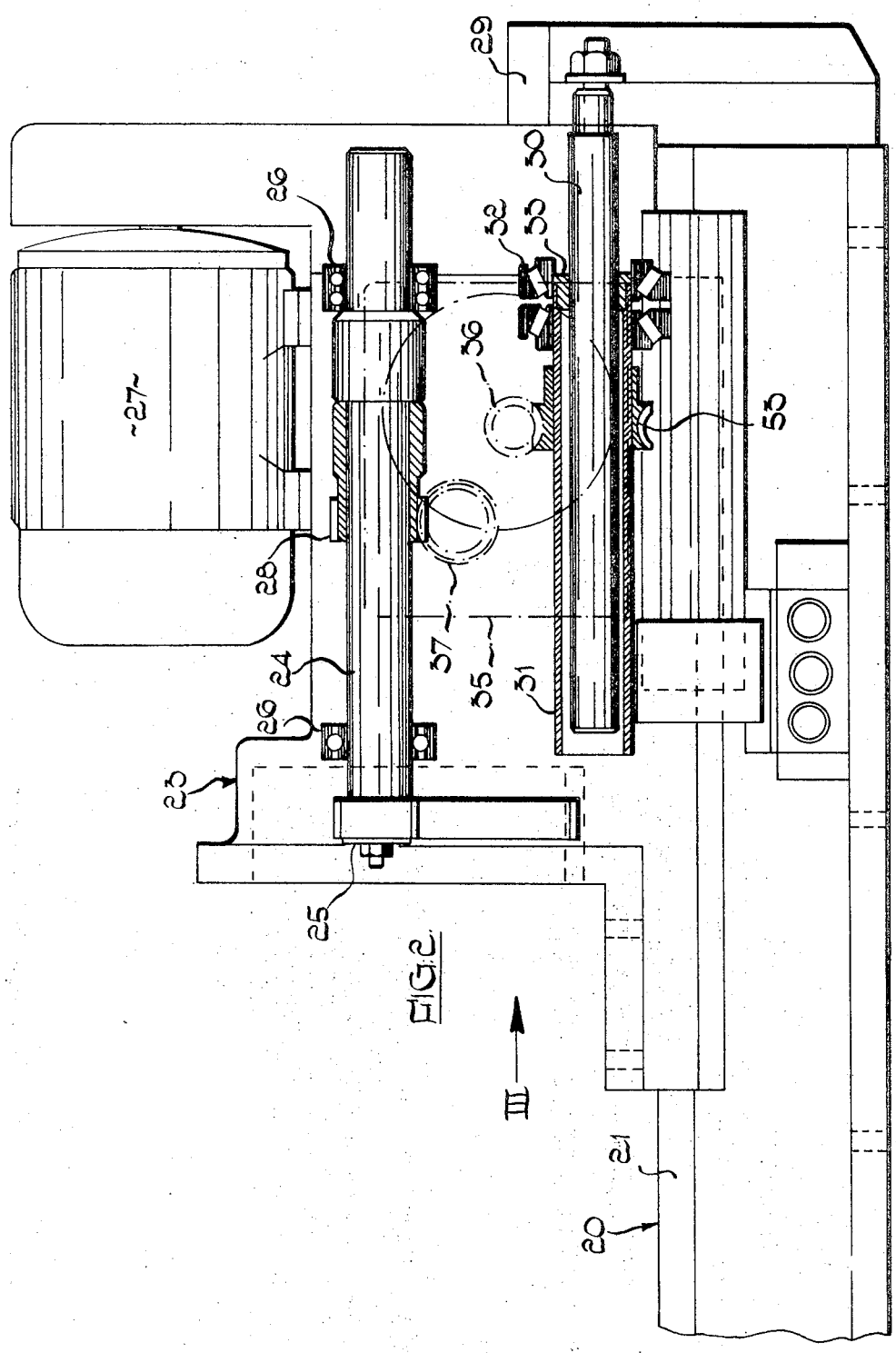

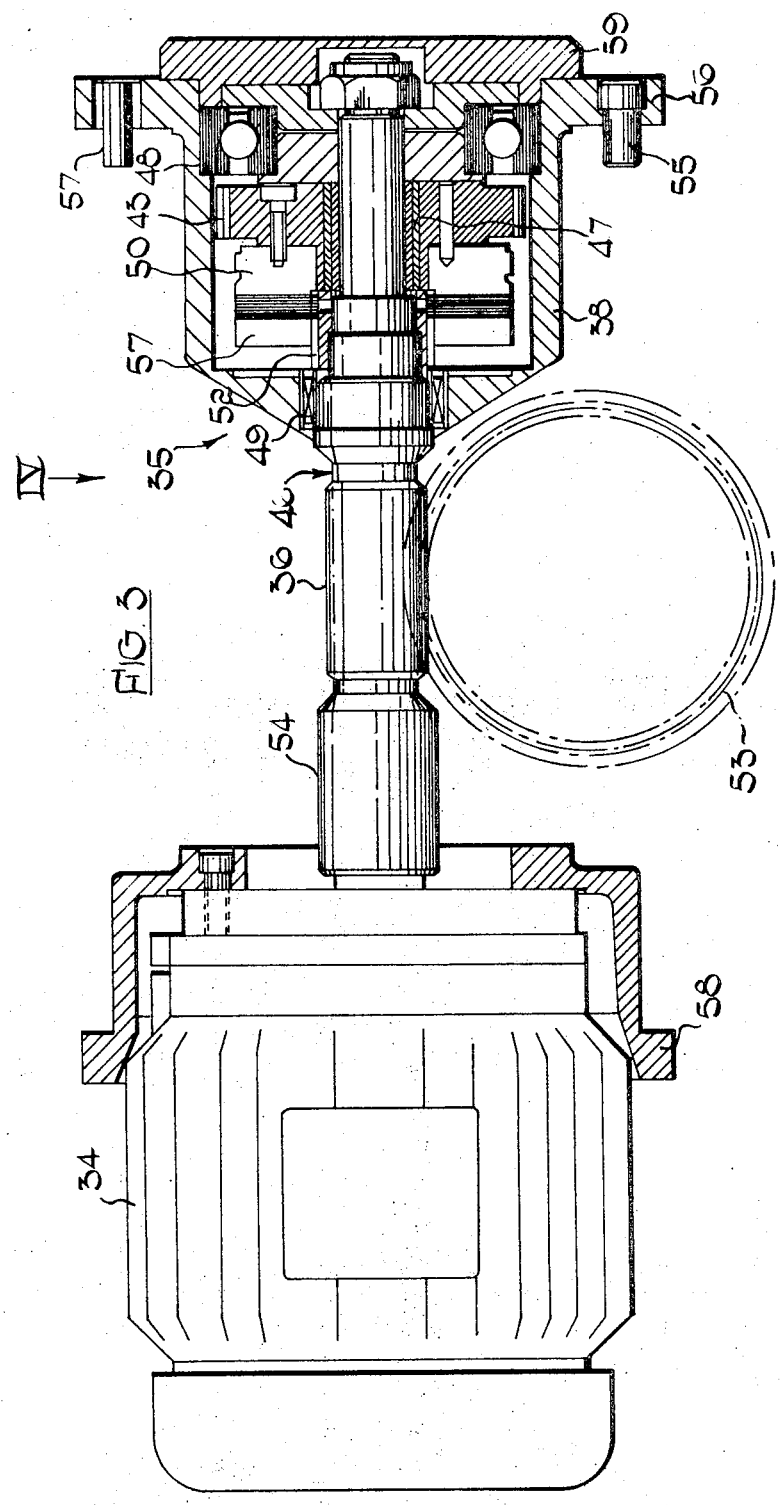

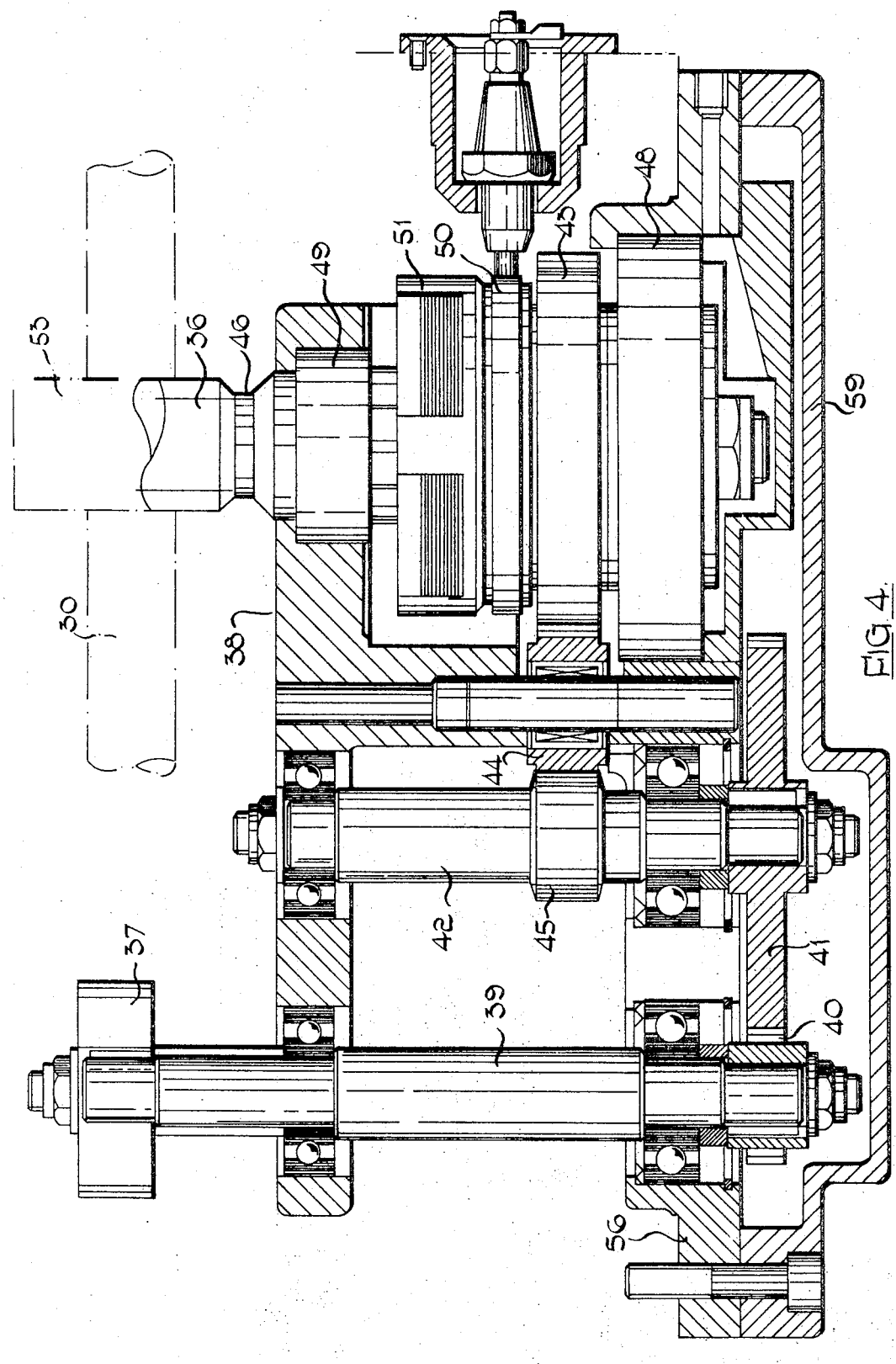

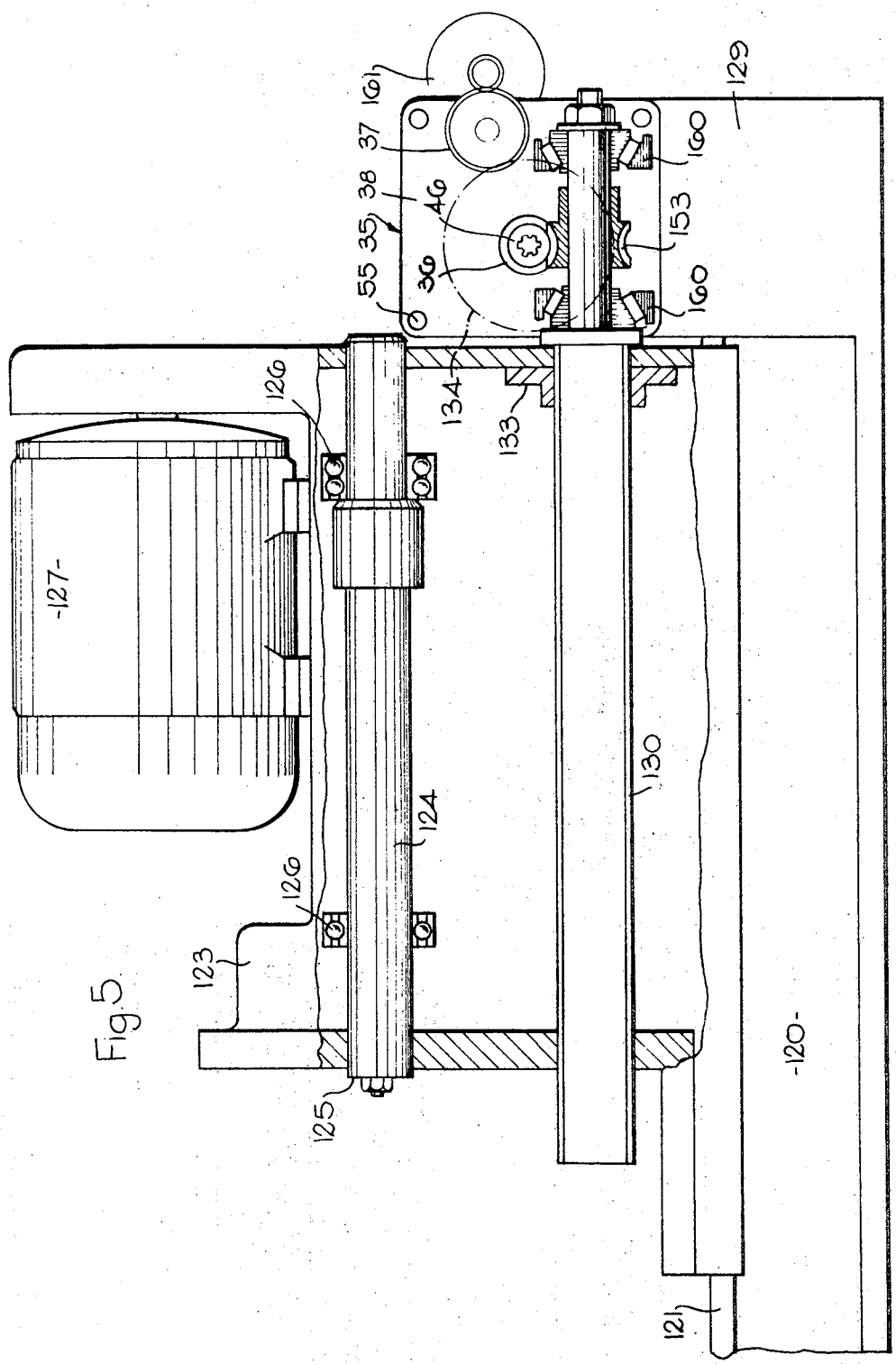

SCREW FEED UNIT HEAD

BACKGROUND OF THE INVENTION

This invention relates to an automatic screw feed unit head comprising a drive motor, a spindle arranged to be driven by the motor and adapted to be coupled to a cutting tool, and screw means for feeding the spindle and associated tool relative to a base member. For convenience such apparatus is hereinafter referred to simply as a unit head.

Unit heads are commonly incorporated as components in multi-station machines used for performing automatically on a workpiece several successive cutting operations such as drilling, tapping, milling and spot facing with rotary tools. For example, a machine may comprise an indexable table for carrying workpieces to successive machining stations, and a number of unit heads positioned around the table and each carrying one or more appropriate cutting tools for operating on a workpiece at a respective one of the machining stations. Several unit heads may be arranged for operation of a workpiece at the same machining station. A great variety of machines can be built up by combining one or more unit heads with workpiece holding means on a suitable stand or support. Thus, a machine can be arranged specifically for the automatic production of a particular item, and if production of that item is terminated, the component unit heads can be incorporated in a machine for producing some different item.

In a conventional unit head, the drive motor and spindle are mounted on or in a body which is slidable along a slideway formed on the base member. The screw means comprises a lead screw connected with the base member for rotation relative thereto but in such a manner as to prevent axial displacement of the lead screw relative to the base member. A nut is mounted in the body for co-operation with the lead screw, the nub being rotatable relative to the body but axial movement of the nut relative to the body being prevented. A gear train is arranged in the body to transmit drive from the spindle to the nut for the purpose of feeding the body and spindle along the slideway at a slow speed when cutting tools associated with the spindle are engaged with a workpiece.

To enable the body to be moved rapidly along the base member in order to withdraw the cutting tools from a workpiece, or to advance the tools towards the workpiece before the tools engage same, a further motor, herein called the quick traverse motor, is coupled to the lead screw to rotate same in either direction. Such quick traverse motor is positioned at the rear end of the lead screw and normally projects rearwardly beyond the base member.

In order to ensure that the slow feed of the body which takes place during a cutting stroke is at a predetermined speed, it is necessary to hold the lead screw against rotation whilst such slow feed is taking place. Accordingly, an electro-magnetic brake is normally interposed between the lead screw and the quick traverse motor to hold both of these stationary when the quick traverse motor is not energised. The brake is normally positioned at the rear end of the lead screw and projects beyond the rear end of the base member. The quick traverse motor is positioned to the rear of the brake and therefore projects for a considerable distance beyond the base member. In a case where the unit head is mounted horizontally, the quick traverse motor is frequently in a vulnerable position owing to the fact that it projects beyond a stand or base upon which the unit head is mounted, and quick traverse motors are subject to damage by impact from passing load handling trucks or the loads thereon.

When the unit head is mounted vertically, the quick traverse motor is normally in a position which is relatively invulnerable, and also relatively inaccessible. Thus, any maintenance or repair work which is required to be carried out on the quick traverse motor or the brake presents difficulties of accessibility.

Since the brake must be capable of holding the lead screw stationary whilst it is subjected to considerable torque reaction by rotation of the nut to feed the cutting tools into a workpiece, the brake must be a powerful one and the brake contributes considerably to the overall cost of a feed unit. Furthermore, the brake is a major source of noise emitted from the unit head during operation.

In conventional unit heads the gear assembly which transmits drive from the spindle to the nut of the feed mechanism is generally built directly into the body, bearings for the rotatable elements being mounted in suitable apertures formed in the body. Accordingly, it is generally not convenient or possible to fit the same gear assembly in different models of unit head having different bodies. Similarly, the lead screw and rotatable elements which transmit drive thereto from the quick traverse motor are supported in bearings which are mounted directly, in a casing attached to the base member, and it is not in all cases convenient to fit the same assembly of lead screw and associated elements in different casings. Thus, in order to produce a range of models of unit heads, it has generally been necessary to produce specific gear assemblies for transmitting drive from the spindle to the nut and from the quick traverse motor to the lead screw for each model in the range.

The body of a unit head is necessarily a somewhat bulky and heavy member and this adds to the difficulty and cost of assembling directly into the body the gear assembly which transmits drive from the spindle to the nut, since the casing cannot be handled easily.

A further disadvantage of conventional unit heads is that both the lead screw and the nut are mounted for rotation under heavy axial loads. Accordingly, two sets of heavy duty bearings must be provided, one set for the nut and the other set for the lead screw, both sets of bearings being provided with a lubricant supply system and oil seals. These heavy duty bearings and associated parts contribute considerably to the cost of the complete unit head.

It is an object of the present invention to provide a unit head which can be constructed more cheaply than unit heads known hitherto, or a unit head of more compact form than conventional unit heads of similar power.

SUMMARY OF THE INVENTION

According to one aspect of the invention there is provided a unit head wherein the screw means for feeding the spindle relative to the base member comprises first and second elements threadedly engaged with one another, said first element is rotatable and axially translatable relative to the base member but is non-translatable relative to the spindle, said second element is fixed against both rotation and translation relative to the base member, drive means is provided for transmitting rotary drive from the spindle or the drive motor through clutch means to the first element to translate the latter and the spindle relative to the base member, and a quick traverse motor is provided for rotating the first element in either direction to translate same and the spindle more rapidly relative to the base member, the clutch means then permitting rotation of the first element independently of the spindle.

Since the second element is non-rotatable, no bearings are required for mounting same. Furthermore, it is unnecessary to provide a releasable brake for holding the second element stationary during slow feed of the spindle.

The clutch means permits the spindle to rotate without undergoing translatory movement. Thus, the drive motor and spindle can rotate continuously during an entire cycle of operation which may include a period during which the spindle remains in a withdrawn position in which tools associated therewith are clear of a machining station, thus permitting a fresh workpiece to be moved into such station.

When the clutch means is disengaged, the spindle can be advanced or withdrawn rapidly, irrespective of whether the spindle is being driven, and when the clutch means is re-engaged, the translatory motion of the spindle and associated parts will be braked by the rotational inertia of the drive motor and spindle. If the spindle is being driven continuously, re-engagement of the clutch means will reduce the speed of translation of the spindle to a value determined by the speed of rotation thereof and which is appropriate for feed of the cutting tools into the workpiece. If the spindle is not being rotated when the clutch is re-engaged, the spindle will be brought to rest.

Preferably, said second element is a lead screw and said first element is a nut rotatable on the lead screw.

With this arrangement, the quick traverse motor may conveniently be arranged beside the lead screw, thus providing a unit head which is shorter than conventional unit heads wherein the quick traverse motor is at the end of the lead screw.

Preferably, said clutch means is adapted to slip at a predetermined torque load, thus limiting the torque which can be transmitted from the spindle or drive motor to the first element.

The clutch means thus acts as a safety device to prevent overloading and also enables the spindle and cutting tools associated therewith to dwell for a predetermined period in an advanced position to produce a smooth finich when certain metal cutting operations are performed. Such dwell is achieved by positioning a stop in such a position as to arrest forward movement of the spindle in the required position whilst the spindle is still being driven rotatably. A timing device may be provided for causing disengagement of the clutch means and operation of the quick traverse motor after a predetermined dwell period to withdraw the spindle and tools.

The spindle and the first element of the screw means may be mounted in a body which is slidable on the base member, and the drive means may comprise a drive unit which is insertable into the body, such unit including said clutch means, a first rotatable input element connectable with the spindle, a second rotatable input element connectable with the quick traverse motor and a rotatable output element connectable with said first element of the screw means.

With this arrangement, drive is transmitted to the first element of the screw means from either the spindle or the quick traverse motor by the drive unit, and the number of rotatable elements and bearings therefor which are required is smaller than the number of rotatable elements in a conventional unit head with separate drive assemblies for transmitting drive to the screw means from the quick traverse motor and from the spindle. Furthermore, the bearings for the rotatable elements are not built directly into the body, but are built into the unit which in turn is releasably attached to the body. It will be appreciated that the drive unit may be considerably smaller and lighter than the body and is therefore handled more easily during construction and any modification or repair work which is necessary.

A further advantage afforded by the drive unit is that a single drive unit may be utilised in various models of unit head, such models having bodies of different form each adapted to receive the single drive unit. Since the drive unit is one of the most expensive components of the unit head, the use of a single form of drive unit in a range of unit heads results in lower overall cost of the unit heads.

According to a further aspect of the invention there is provided a unit head wherein the screw means for feeding the spindle relative to the base member comprises first and second elements threadedly engaged with one another, said first element is fixed against both rotation and displacement relative to the spindle, said second element is rotatable but is non-translatable relative to the base member, drive means is provided for transmitting rotary drive selectively from one of two motors to translate the spindle relative to the base member, said two motors providing respectively rapid traverse and relatively slower feed motion, and said drive means comprises a drive unit which is dismountable from the remainder of the unit head and which includes a rotary output element coupled or adapted to be coupled with said second element of the screw means, and first and second rotatable input elements coupled or adapted to be coupled respectively with said motors.

Preferably said two motors are additional to the drive motor for rotating the spindle.

In a preferred construction according to this further aspect of the invention, the second element of the screw means is in the form of a lead screw and the first element is in the form of a nut threadedly engaged with the lead screw. The lead screw may be supported in bearing means disposed at one end of the base member and adapted to prevent axial movement of the lead screw relative to the base member, the nut being rigidly mounted in a body which is slidable along the base member and which supports the spindle.

BRIEF DESCRIPTION OF THE DRAWINGS

FIG. 1 is a diagrammatic representation of a conventional form of unit head,

FIG. 2 is a view in side elevation and partly in cross-section of a unit head according to the present invention, certain parts only of the unit head being shown and the drive unit thereof being omitted, FIG. 3 is a view partly in section and on an enlarged scale of the drive unit and quick traverse motor of the unit head shown in Figure, viewed in the direction of the arrow 3 on FIG. 2, FIG. 4 is a view of the drive unit in the direction of arrow 4 of FIG. 3, and on a further enlarged scale, and FIG. 5 is a view similar to FIG. 2 illustrating a further unit head according to the present invention and incorporating the drive unit shown in FIGS. 3 and 4.

DETAILED DESCRIPTION

The conventional unit head illustrated in FIG. 1 comprises a base member 1 formed on its upper face, as viewed in FIG. 1, with a slideway along which a body 2 is slidable from right to left as viewed in FIG. 1. A thrust block 3 is rigidly attached to the base member 1 at an end thereof which is referred to herein as the rearward end. Within the thrust block there is provided bearing means for mounting a lead screw 4 which projects forwardly from the thrust block above and parallel to the slideway in the base member 1. For illustrative purposes, this bearing means is shown comprising axially spaced ball bearings 5, but it will be appreciated that normally roller bearings capable of transmitting a large axial thrust are provided. The bearings 5 permit rotation of the lead screw relative to the thrust block, but prevent relative axial displacement.

An electric motor 6, herein called the quick traverse motor, is mounted on the thrust block 3 to the rear of the lead screw 4 and the shaft of this motor is coupled by a gear train indicated at 7 with the lead screw to drive same. For the purpose of holding the lead screw stationary when required, an electro-magnetic brake 8 is mounted on the rear end of the motor 6 and is coupled with the drive shaft thereof. In a common alternative construction, the brake is mounted on the thrust block and the quick traverse motor is positioned to the rear of the brake.

The unit head is commonly mounted on a stand or bed with the base member 1 extending horizontally and secured rigidly to the bed. Generally the bed does not extend rearwardly beyond the base member 1 and therefore the brake 8 and quick traverse motor 6 project beyond the bed and are thus in a vulnerable position in which they can easily be damaged by passing vehicles such as fork lift trucks, or loads carried thereby. Unit heads are also commonly mounted with the base member extending vertically, in which case the brake 8 and quick traverse motor 6 are positioned above the base member and at a considerable height above the workshop floor. When the unit head is mounted in this manner, the brake and quick traverse motor are not readily accessible for maintenance or repair work.

A spindle 9 is mounted in the body 2 by means of bearings indicated at 10. At least one of the spindle bearings would be of a form, such as a taper roller bearing, capable of transmitting large axial loads between the spindle and the body. At its forward end the spindle is adapted for connection to a rotatable cutting tool such as a drill, milling tool or boring rool. Alternatively, an attachment may be fitted to the forward end of the body, such attachment carrying a number of cutting tools and means for connecting all of these cutting tools drivingly with the spindle.

A drive motor 11 is mounted on the body 2 and is provided with a drive shaft 12 connected through a gear assembly 13 with the spindle 9 for driving same rotatably.

A sleeve 14 which surrounds the lead screw 4 is mounted in the body 2 by means of bearings indicated diagrammatically at 15 and which are also adapted to transmit a large axial thrust. A nut 16 which is threadedly engaged with the lead screw 4 is rigidly secured within the rear end of the sleeve 15 so that rotation of the latter will cause the body and parts carried thereon to move forwardly or rearwardly with respect to the base member 1. A worm wheel 17 is keyed on the sleeve 14 near the forward end of the latter to enable drive to be transmitted thereto from the spindle 9.

For the purpose of transmitting drive from the spindle 9 to the sleeve 14, there is provided an assembly of gear elements, two of which are indicated in chain lines at 18. One of these elements is in the form of a worm for co-operation with the worm wheel 17, and the other element meshes with a gear 19 keyed on the spindle 9.

Whenever the spindle 9 is rotated by the drive motor 11, drive is transmitted to the sleeve 14 which screws the nut 16 along the lead screw 14 and thus provides feed motion of the body and spindle in the forward direction and at a slow speed. In order to obtain this slow feed motion, the brake 8 is applied to prevent rotation of the lead screw. Normally a slipping clutch is fitted in the assembly of gear elements 18 to limit the torque which can be transmitted to the sleeve 14 so that overloading of the unit head can be avoided. This slipping clutch also permits the cutting tools to dwell temporarily in a predetermined position relative to the base member 1 whilst the spindle 9 continues to rotate. This is achieved by positioning a stop in the path of the body 2 so that forward movement of the body and spindle will be arrested at the required position.

Rapid retraction of the body and spindle can be effected by rotating the lead screw 4 in the appropriate direction by means of the quick traverse motor 6. If the body is required by remain stationary in a withdrawn position for a short period to permit a further workpiece to be brought into the machining station whilst the cutting tools are withdrawn therefrom, the drive motor 11 must be stopped to prevent rotation of the sleeve 14. Rapid forward traverse of the body is effected by the quick traverse motor 6 driving the lead screw 4 in the opposite direction.

Referring now to the unit head illustrated in FIGS. 2, 3 and 4, this comprises a base member 20 on one face of which is formed a slideway 21. A body 23 is mounted on the slideway for rectilinear movement forwardly and rearwardly of the base member.

Within the body 23 there is mounted a spindle 24, the forward end portion 25 of which is adapted for connection to a single rotatable cutting tool, or to an attachment which includes a plurality of rotatable cutting tools and means for driving same from the spindle. The spindle is supported for rotation about an axis parallel to the slideway 21 by bearings 26 which are detachably mounted in suitable apertures formed in the body 23.

A drive motor 27 is mounted on a face of the body 23 remote from the base member 20 and is connected by a belt drive or a gear train (not shown) housed within the body with the spindle 24. A gear 28 is keyed on the spindle for co-operation with a drive unit as will be described hereinafter.

A thrust block 29 is attached to the rearward end of the base member 20 and projects upwardly therefrom. A lead screw 30 is rigidly mounted on the thrust block and projects forwardly therefrom into the body 23 and parallel to the spindle 24. The lead screw is rigid with the thrust block 29 so that rotation and displacement of the lead screw relative to the base member 20 are both prevented.

A sleeve 31 which surrounds the lead screw 30 is mounted in the body 23 by bearings 32 which provide for rotation of the sleeve relative to the body and which are capable of transmitting a large axial thrust between the body and the sleeve. A nut 33 is mounted within and keyed to the sleeve and is in threaded engagement with the lead screw 30. Thus, when the sleeve is rotated, the body is moved forwardly or rearwardly relative to the base member 20.

For the purpose of driving the sleeve 31 to cause rapid advance or withdrawal of the body 23 along the base member 20, a rapid traverse motor 34, not shown in FIG. 2, but shown in FIG. 3, is mounted in the body. For the purpose of transmitting drive from both the rapid traverse motor and the spindle 24, as required, to the sleeve 31 there is provided a drive unit 35 which is shown in outline only by a chain line in FIG. 2, and which is shown in detail in FIGS. 3 and 4. The drive unit includes a rotary output element 36 which meshes with a worm wheel 53 keyed on the sleeve 31, and a first rotatable input element 37 which meshes with the gear 28 on the spindle. The positions of the elements 36 and 37 are indicated by chain lines in FIG. 2.

Referring now to FIGS. 3 and 4, the drive unit 35 comprises a support 38 which is conveniently formed as a casting, openings being provided for receiving bearings for supporting the several rotatable elements of the drive unit.

The first rotatable input element 37 is in the form of a gear which is keyed on one end of an input shaft 39 supported by bearings in the support member 38. When the drive unit is assembled with the body 23, the gear 37 is constantly meshed with the gear 28 on the spindle.

A pick-off gear 40 is detachably mounted on the other end of the input shaft 39 and meshes with a further pick-off gear 41 carried on an intermediate shaft 42 also mounted by suitable bearings in the support member 38. The pick-off gear 41 is also detachable from the intermediate shaft 42 and the paid of pick-off gears 40, 41 may be replaced by a further pair of pick-off gears which provide an alternative gear ratio between the first input element and the output element 36.

The intermediate shaft 42 is drivingly connected with a large gear 43 through an idler pinion 44 which meshes with the larger gear and with a gear 45 keyed on the intermediate shaft. The large gear 43 is carried on an output shaft 46 for rotation relative thereof, a bearing 47 being interposed between the output shaft and the gear 43.

The output shaft 46 is carried in bearings 48 and 49 which are mounted in the support member 38. An electromagnetic clutch is also carried on the output shaft at a position adjacent to the large gear 43. A body 50 of the clutch is keyed and dowelled to this large gear for rotation therewith, and a further portion of the clutch including the inner plates thereof is drivingly connected to the output shaft through a splined hub 52.

When the clutch is engaged the output shaft is drivingly connected with the input shaft 39 and the spindle 24. When the clutch is disengaged the output shaft can rotate independently of the spindle and of the other rotatable gear elements of the drive unit.

A portion of the output shaft which protrudes from the support member 38 of the drive unit is formed with a worm 36 which constitutes the rotatable output element of the drive unit previously mentioned. When the drive unit is assembled into the body 23 of the unit head, this worm is constantly meshed with the worm wheel 53 which is carried on and keyed to the sleeve 31.

An end portion 54 of the output shaft 46 remote from the drive unit support member 38 is formed with a splined socket which receives a splined drive shaft of the quick traverse motor 34. This end portion 54 constitutes a second rotatable input element of the drive unit.

The drive unit 35 is removably mounted in the body 23 by means of bolts 55 which extend from a mounting flange 56 of the drive unit support member 38 into appropriate apertures in the body 23. The drive unit is accurately located by means of dowels, one of which is indicated at 57, carried by the mounting flange 56. When the bolts 55 are released, the drive unit can be withdrawn laterally from the body, the end portion 54 of the output shaft sliding off the drive shaft of the quick traverse motor 34.

The quick traverse motor 34 is provided with a mounting flange 58 similar to the mounting flange 56 of the drive unit. The quick traverse motor is mounted in a similar manner on the side of the body 23 opposite to the drive unit 35 and can be withdrawn from the body in the opposite lateral direction. The positions of the quick traverse motor and of the drive unit relative to the body can be interchanged if required.

When the quick traverse motor 34 is required to traverse the body 23 forwardly or rearwardly at a relatively high speed to withdraw tools from a workpiece, or to advance tools up to a workpiece, drive is transmitted by the output shaft 46 from the quick traverse motor drive shaft to the sleeve 31 and the nut 33 is screwed in the appropriate direction along the lead screw 30. During such quick traverse movement, the clutch 50, 51 is disengaged and it will be noted that although the output shaft 46 and the inner clutch plates 51 are rotated at a relatively high speed, for example 1,500 r.p.m., the remaining rotatable elements of the drive unit are not rotated at this high speed. Accordingly, much less noise is produced than would be the case if the gear elements of the drive unit were rotated with the output shaft during the rapid traverse motion.

Whilst the rapid traverse motion is taking place, the spindle 24 may be rotated continuously by the drive motor 27, or such rotation may be stopped. In the former case when the quick traverse motion is terminated and the clutch 50, 51 re-engaged, the spindle and drive motor will exert a braking torque on the output shaft 46 and the sleeve 31 to reduce the speed of the latter to a slow feed speed. If the spindle is not being rotated when the clutch is re-engaged, the sleeve 31 will be brought to rest, thus arresting the translatory movement of the body 23.

When forward feed at a low speed of the spindle 24 is required, the spindle is rotated by the drive motor 27 and the clutch 50, 51 is engaged. The relative sizes of the gear elements comprised by the drive unit 35 are such that the output shaft 46 is rotated at a slow speed relative to the spindle 24. The nut 33 is thus rotated slowly and the body 23 and spindle are fed forwardly at a slow speed. Since the quick traverse motor is drivingly connected with the output shaft, this motor also will be rotated slowly, but the speed of rotation is so slow that the drag of the quick traverse motor is negligible.

The rate of the slow feed motion is directly proportional to the speed of rotation of the spindle 34. The feed rate for a given spindle speed can be varied by exchanging the pair of pick-off gears 40, 41 for a pair of different pick-off gears which provide the required gear ratio. These pick-off gears are readily accessible from the exterior of the body 23 by removal of a cover plate 59.

The clutch 50, 51 is capable of transmitting only a predetermined torque to the output shaft 46 from the spindle 24. The clutch thus acts as a safety device to prevent overloading of the unit head. The clutch also permits a cutting tool driven by the spindle to dwell at a forward position for a brief period whilst still rotating. To achieve such dwell, a stop is positioned on the base member 20 in the path of travel of the body 23 so that the latter will be brought to rest when the cutting tool is in the required dwell position. When the body engages this stop, the clutch will slip and the spindle will continue to rotate whilst the body remains stationary.

It will be noted that the clutch 50, 51 is operatively interposed between the output shaft 46 and the pick-off gears 40, 41. The torque which can be delivered to the sleeve 31 is thus limited to a predetermined value by the clutch and is not dependent upon the gear ratio provided by the pick-off gears. Thus, the thrust which can be provided by a particular unit head can be predetermined, irrespective of the gear ratio between the spindle and the sleeve 31. If required, the limiting torque which can be transmitted by the clutch may be varied by changing the D.C. voltage supplied to the clutch. Alternatively, the clutch may be replaced by a different clutch capable of transmitting a larger or smaller limiting torque.

The brush gear of the clutch is associated with the body 50 which, as previously mentioned, rotates only relatively slowly, for example 30 r.p.m. Accordingly, wear of the brush gear takes place at a very slow rate and the working life of the brush gear is correspondingly long. Furthermore, if the clutch body is slightly out of balance, no undue wear will be caused since the body is not rotated at high speed.

When the clutch 50, 51 is disengaged, the spindle 24 can rotate independently of the sleeve 31 and therefore the spindle and cutting tools may be driven continuously during a period of use of the unit head, irrespective of whether the body 23 and cutting tools are required to remain stationary in a withdrawn or rearward position intermittently to permit a workpiece upon which the tools have operated to be replaced by a fresh workpiece.

The provision of the gear assembly which transmits drive from the spindle 24 to the nut 33 in a dismountable unit enables the complex boring and other machining operations required to form suitable openings to receive bearings which support the gear elements to be performed on the drive unit support member 38 which is relatively small, as compared with the body 23. These boring and other operations can therefore be performed more easily and more cheaply than would be the case if the bearing openings were required to be formed in the body.

Furthermore, the drive unit 35 can be utilised in a number of different models of unit head having bodies of different form. Thus, the drive unit, which is one of the most expensive components of the unit head, can be produced in quantities much larger than the quantity of any particular model of unit head produced.

Since the drive unit can readily be dismounted from the body, maintenance or repair work may be carried out on the drive unit whilst the latter is separate from the unit head, and a spare drive unit may be fitted to the unit head to permit the latter to be used whilst the maintenance or repair work is carried out. The size and weight of the drive unit are such that it can readily be handled manually.

Although the clutch 50, 51 is preferably an electromagnetic clutch, an alternative form of clutch such as an hydraulic clutch could be used.

Certain parts of the unit head illustrated in FIG. 5 correspond to parts of the unit head shown in FIG. 2. These corresponding parts are indicated by like reference numerals with the prefix 1, and the preceding description is deemed to apply except for the differences hereinafter mentioned.

The base 120 of the unit head shown in FIG. 5 includes at its rearward end a thrust block 129. A lead screw 130 is mounted by means of thrust bearings indicated diagrammatically at 160 on the thrust block to project forwardly therefrom above the slideway 121 of the base. The bearings 160 permit rotation of the lead screw about its axis relative to the base member 120, but prevent displacement of the lead screw relative to the base member and thrust block.

The lead screw 130 extends through the body 123 in which the spindle 124 is mounted. A nut 133 which is threadedly engaged with the lead screw 130 is rigidly secured to the body 123 so that rotation of the lead screw drives the body along the slideway 121 formed on the base member.

For driving the lead screw 130 there is provided a drive motor 161 which is mounted on the thrust block 129. There is also removably mounted on the thrust block a drive unit 35 identical with the drive unit described with reference to FIGS. 2, 3 and 4. The support 38 of the drive unit is secured to the thrust block by bolts 55.

The first rotatable input element 37 of the drive unit 35 shown in FIG. 5 meshes with a gear secured on an output shaft of the motor 61, or on the output shaft of a reduction gearbox driven by this motor. The worm 36 of the drive unit which constitutes the rotatable output element thereof meshes with a worm wheel 153 carried on and keyed to the lead screw 130. An end portion of the output shaft 146 of the drive unit, on which shaft the worm 36 is mounted, is formed with a splined socket which receives a splined drive shaft of a quick traverse motor 134 indicated by a chain line in FIG. 5. The quick traverse motor is mounted on the thrust block 129 at the side thereof opposite to the drive unit 35.

For rapid traverse of the spindle 124 and body 123 in either direction along the base member 120, the quick traverse motor 134 is energised to rotate the lead screw in the appropriate direction, the clutch 50, 51 of the drive unit being disengaged.

To obtain slow feed of the spindle 124, the feed motor 161 is energised and the clutch 50, 51 is engaged to transmit drive to the lead screw, the latter being rotated at a slower speed than it is rotated by the quick traverse motor 134. During slow speed feed of the spindle, the quick traverse motor is driven slowly by the feed motor, but the speed of rotation is so slow that the drag exerted by the quick traverse motor is negligible.

Rotation of the spindle 124 is effected by a further drive motor 127 mounted on the body 123 and connected with the spindle through a gear train which is not shown in FIG. 5.

I claim:

1. In a unit head comprising;
a drive motor;
a spindle arranged to be driven by the motor and adapted to be coupled to a cutting tool;
and screw means for feeding the spindle and associated tool relative to a base member; the improvement wherein:
the screw means comprises first and second elements threadedly engaged with one another;
said first element is rotatable and axially translatable relative to the base member but is non-translatable relative to the spindle;
said second element is fixed against both rotation and displacement relative to the base member; drive means is provided for transmitting rotary drive from the spindle through clutch means to the first element to translate the latter and the spindle relative to the base member;
a quick-traverse motor is provided; there is further provided means for transmitting drive from the quick traverse-motor to said first element, whereby the first element can be rotated in either direction to translate same and the spindle more rapidly relative to the base member, the clutch means then permitting rotation of the first element independently of the spindle.

2. In a screw feed unit head comprising:
a drive motor;
a spindle arranged to be driven by the motor and adapted to be coupled to a cutting tool;
and screw means for feeding the spindle and associated tool relative to a base member; the improvement wherein:
said screw means comprises first and second elements threadedly engaged with one another;
said first element is fixed against both rotation and displacement relative to the spindle;
said second element is carried on the base member by bearing means providing for rotation of the second element relative to the base member, but preventing translation of the second element relative to the base member;
a feed motor is provided for driving said second element rotatably;
a quick-traverse motor is provided for driving said second element at a higher speed;
and drive means is provided for transmitting rotary drive selectively from one of said feed motor and quick-traverse motor to said second element, the drive means comprising a drive unit which is dismountable from the remainder of the unit head and which includes a rotatable output element releasably coupled with said second element for driving same, and first and second rotatable input elements releasably coupled respectively with said feed motor and said quick-traverse motor to be driven by same.

3. The improvement according to claim 1 wherein said clutch means is adapted to slip at a predetermined torque load, thereby limiting the torque which can be transmitted from the spindle to the first element.

4. The improvement according to claim 1 wherein:
said spindle and said first element of the screw means are mounted in a body which is slidable on the base member;
and the drive means comprises a unit insertable into the body, such unit including said clutch means, a first rotatable input element connectable with the spindle, a second rotatable input element connectable with the quick-traverse motor, and a rotatable output element connectable with said first element of the screw means.

5. The improvement according to claim 2 wherein:
the unit head further comprises a housing rigid with the base member;
bearing means for supporting said second element of the screw means is secured to said housing;
said drive unit is releasably mounted in said housing;
and said quick-traverse motor is also releasably mounted in the housing.

6. The improvement according to claim 2 wherein said drive unit further comprises clutch means operatively interposed between a first of said rotatable input elements and the rotatable output element, a second of said rotatable input elements being connectable with the quick-traverse motor, whereby said clutch means permits the feed motor to be selectively coupled to the rotatable output element.

7. The improvement according to claim 6 wherein said clutch means is adapted to slip at a predetermined torque load, thus limiting the torque which can be transmitted from said feed motor to the second element of the screw means.

8. The improvement according to claim 6 wherein said second rotatable input element and said rotatable output element are rigidly connected with one another for rotation about a common axis.

9. The improvement according to claim 4 wherein said second rotatable input element and said rotatable output element are rigidly connected with one another for rotation about a common axis.

10. The improvement according to claim 4 wherein said second rotatable input element is connectable with the quick-traverse motor by means which provides for axial sliding movement of the quick-traverse motor relative to the drive unit.

11. The improvement according to claim 5 wherein said second rotatable input element is connectable with the quick-traverse motor by means which provides for axial sliding movement of the quick-traverse motor relative to the drive unit.

* * * * *